Feb. 3, 1931.                G. H. DOWTY                1,791,484
       SHOCK ABSORBING AND SPRINGING MECHANISM WITH PARTICULAR
                  APPLICATION TO AIRCRAFT REQUIREMENTS
                         Filed Dec. 26, 1929
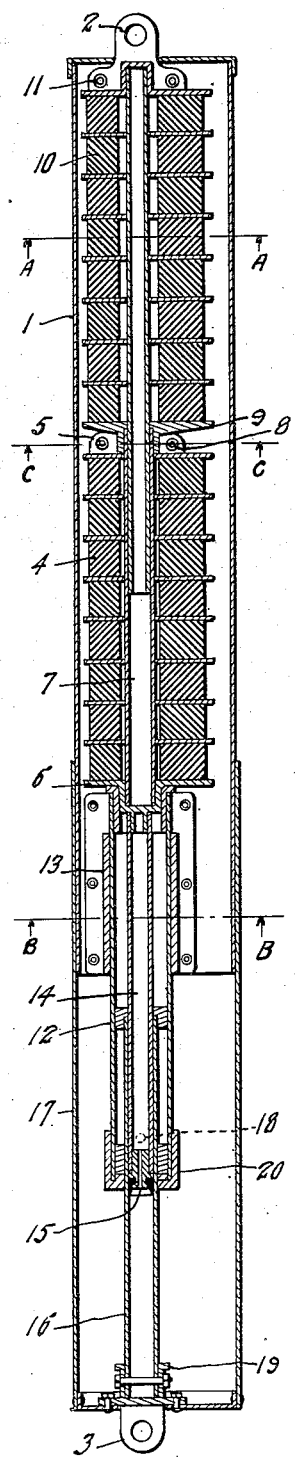
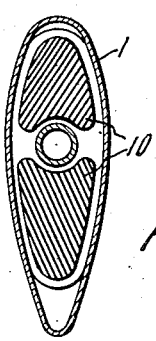
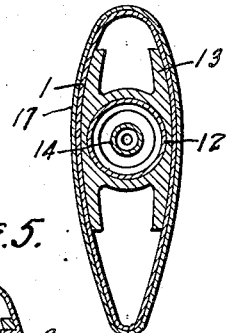
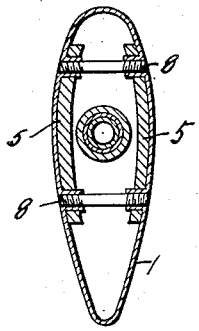
Inventor
GEORGE H. DOWTY
Herbert W. J. Jenner
By
Attorney Patented Feb. 3, 1931

1,791,484

UNITED STATES PATENT OFFICE

GEORGE HERBERT DOWTY, OF CHELTENHAM, ENGLAND

SHOCK-ABSORBING AND SPRINGING MECHANISM WITH PARTICULAR APPLICATION TO AIRCRAFT REQUIREMENTS

Application filed December 26, 1929, Serial No. 416,705, and in Great Britain December 20, 1928.

This invention relates to shock absorbing and springing mechanisms wherein the springing consists of two or more resilient units disposed vertically one above another and connected in such manner that the sprung load is divided between the several units.

The object of this invention is to provide a shock absorbing member of finer overall proportions than has hitherto been possible and in this way to reduce the aerodynamic resistance of this component and make considerable saving in weight.

In conventional undercarriage designs the load is carried by what is virtually one cross section of springing. This is actually the case irrespective of the springing medium employed. The size of these shock absorber members is determined by the dimensions of the springing medium and this has resulted in a member of very much greater frontal area than is required for a steel strut carrying the same load.

According to this invention the springing consists of several independent compression or tension units arranged vertically one above another with each unit having one end anchored to a common fixing. The opposite ends of each unit are interconnected so that a load applied to any unit will cause all the other spring units to deflect simultaneously.

In order that the invention may be fully understood and readily carried into effect, it will now be described more fully in conjunction with the accompanying drawings which illustrate its application to an aeroplane undercarriage.

In these drawings Figure 1 is a cross section through the shock absorbing and springing unit and shows a front elevation thereof. Figure 2 shows the application of this unit to an aeroplane undercarriage. Figures 3, 4, and 5 illustrate sections through the shock absorbing member.

Referring now more particularly to Figure 1. The main body of the shock absorbing member or leg consists of a one piece streamline steel tube (1). The leg is anchored to the aircraft fuselage by fitting (2) and to the axle, at the wheel hub, by fitting (3). Two columns of compression rubbers are used in this design although, for legs of larger machines, a greater number can advantageously be employed.

The lower column of rubbers (4) lies between a fixed beam (5), which is fastened to the main streamline tube by fixings (8) and a sliding beam (6) which is connected by tube (7) to a further sliding beam (9). The upper column of rubbers (10) lies between the sliding beam (9) and a fixed beam (11) which is formed integral with fitting (2).

Tube (7) is rigidly attached to beam (6) which is carried in turn by tube (12). Tube (12) is centralized and guided by bearing (13) which is anchored to the main streamline tube (1) by fixings similar to those shown at (8) and again in Figure 5. Tube (12) extends an appreciable distance below bearing (13) when the leg is in the "no load" or flying position. Tube (14) is carried by the beam fitting (6) and its lower end carries a valve body and cup leather (15). Tube (16) is carried by fitting (3) and telescopes over tube (14). Fitting (3) may also carry a taper needle or similar means for controlling the portage area of the valve (15).

A lower fairing piece (17) is attached to fitting (3) and telescopes over the main streamline tube (1). A filler (18) is provided in the tube (12) and access to this is obtained through an inspection hole in the fairing piece (17).

The shock absorber leg is shown in the "no load" or flying position, in Figure 1 and when the leg is compressed from the flying position, oil is forced from cylinder (16) through the valve (15) into the cylinder formed by the tube (14). After a predetermined travel on the oil, collar (19), which is formed integral with fitting (3), makes contact with stop (20) which is attached to the end of tube (12) and further compression of the leg will result in the upward movement of the tube (12) with beams (6) and (9). In this manner the two columns of springs (4) and (10) are compressed simultaneously.

It will be apparent that the load has been divided between these two columns and, in view of the placing of one column vertically over the other, a considerable saving in crosssectional area of this member has resulted. The entire springing can thus be accommodated in a strut of very small size and good fineness ratio and comparison of the cross section with that of any other similar unit, carrying an equal load, will show that the drag of this unit is not more than one third that of present day conventional designs.

This invention has in the foregoing particular description been specified with reference to springing consisting of compression rubbers but it will be readily understood that it is equally applicable to any other springing such as steel, tension rubbers or compressed air. The main principles of this invention can be carried into effect in several alternative ways without departing from the spirit of the invention. To cite one particular case, it will be obvious that each of the resilient units may in themselves consist of one or more springs coupled together in series, in parallel or in any other known combination.

An oil or fluid dashpot shock absorber of any known form may be incorporated in this system. Such a dashpot may work simultaneously with, or independently of, the resilient springing. The oil dashpot may be arranged to have an initial travel on the oil and then operate with the springing over the initial travel of the leg only. The dashpot may also provide a recoil or snubbing action to prevent the resilient springing from unloading in too violent a manner.

Having now particularly described my invention what I claim as new and desire to protect by Letters Patent is:—

1. A landing gear for aircraft comprising a telescopic casing of stream lined shape including a hydraulic damping mechanism and a plurality of separately anchored and simultaneously operative spring devices disposed in alignment with the hydraulic damping mechanism.

2. An oleo gear for aircraft comprising telescopic casing members of stream line contour, a dash pot within the casing members, a plurality of segregated spring means within the casing having anchorage points positioned at spaced points on a casing member whereby the thrust taken by the spring means is distributed longitudinally of the casing.

3. An oleo gear for aircraft comprising a stream lined telescopic casing, a hydraulic piston operating within and anchored to one of the telescopic casing members and means to resiliently transmit the thrust of the piston to a plurality of anchorage points on the other casing.

4. An oleo gear for aircraft comprising a stream lined telescopic casing, a hydraulic damping mechanism anchored to one end of one casing, a plurality of spring units positioned in alignment with the damping mechanism, each of the units having a separate anchorage on the casing and having a common operating connection with the damping mechanism.

In testimony whereof I affix my signature.
GEORGE H. DOWTY.